United States Patent
Bahrami et al.

(10) Patent No.: US 9,691,286 B2
(45) Date of Patent: Jun. 27, 2017

(54) DATA DRIVEN AIRPLANE INTENT INFERENCING

(71) Applicant: THE BOEING COMPANY, Chicago, IL (US)

(72) Inventors: Ali Bahrami, Sammamish, WA (US); Robab Safa-Bakhsh, Ridley Park, PA (US); Jun Yuan, Sammamish, WA (US); Paul C. Parks, Mercer Island, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/692,894

(22) Filed: Apr. 22, 2015

(65) Prior Publication Data

US 2016/0314692 A1    Oct. 27, 2016

(51) Int. Cl.
*G08G 5/00* (2006.01)
*G08G 5/04* (2006.01)
*G01C 23/00* (2006.01)

(52) U.S. Cl.
CPC ......... *G08G 5/0017* (2013.01); *G08G 5/0013* (2013.01); *G08G 5/0021* (2013.01);
(Continued)

(58) Field of Classification Search
CPC .. G08G 5/0017; G08G 5/0021; G08G 5/0026; G08G 5/04; G08G 5/045; G01C 23/00; G01C 23/005
See application file for complete search history.

(56) References Cited

U.S. PATENT DOCUMENTS

| 5,892,462 A * | 4/1999 | Tran ........... G08G 5/045 |
| | | 701/301 |
| 6,199,008 B1 * | 3/2001 | Aratow ........ G01C 23/00 |
| | | 701/14 |

(Continued)

OTHER PUBLICATIONS

Wing, David J. et al., Use of Traffic Intent Information by Autonomous Aircraft in Constrained Operations, American Institute of Aeronautics and Astronautics, 2002, pp. 1-14, AIAA, Reston, United States.

(Continued)

*Primary Examiner* — Dale W Hilgendorf
(74) *Attorney, Agent, or Firm* — Patterson + Sheridan, LLP

(57) ABSTRACT

Method, system and computer program product for providing a predicted vehicle track and for providing alerts when two predicted vehicle tracks are closer than a threshold amount. A vehicle intent prediction model is generated based on past instance of tracks for a vehicle operation, known vehicle intent data for the past instances, and contextual factors, such as weather, airline operator, air vehicle type or configuration, day of the week, etc. for the past instances. The vehicle intent prediction model can be generated using one or more machine learning algorithms. A future vehicle trajectory for a current vehicle operation can be output by the vehicle intent prediction model using the current track and existing contextual factors for the current vehicle operation. In the event that two vehicles following their respective predicted vehicle future trajectories would be closer than a threshold distance, an alert can be provided.

21 Claims, 6 Drawing Sheets

(52) U.S. Cl.
CPC ......... *G08G 5/0026* (2013.01); *G08G 5/0052* (2013.01); *G08G 5/0082* (2013.01); *G08G 5/04* (2013.01); *G01C 23/00* (2013.01); *G01C 23/005* (2013.01); *G08G 5/0043* (2013.01); *G08G 5/045* (2013.01)

(56) References Cited

U.S. PATENT DOCUMENTS

| | | | | |
|---|---|---|---|---|
| 6,462,697 | B1* | 10/2002 | Klamer | G08G 5/0026 340/945 |
| 6,950,037 | B1* | 9/2005 | Clavier | G08G 5/0026 701/14 |
| 7,650,232 | B1* | 1/2010 | Paielli | G01C 23/005 701/528 |
| 7,702,427 | B1* | 4/2010 | Sridhar | G08G 5/045 701/14 |
| 7,835,866 | B2* | 11/2010 | Tzidon | G08G 5/045 701/14 |
| 9,014,880 | B2* | 4/2015 | Durling | G08G 5/045 701/301 |
| 2002/0075171 | A1* | 6/2002 | Kuntman | G01C 23/00 340/945 |
| 2009/0088972 | A1* | 4/2009 | Bushnell | G08G 5/045 701/414 |
| 2010/0305781 | A1* | 12/2010 | Felix | G08G 5/045 701/301 |
| 2011/0125346 | A1* | 5/2011 | Ben-Arie | G01C 23/00 701/3 |
| 2012/0158219 | A1* | 6/2012 | Durling | G08G 5/045 701/4 |
| 2012/0209457 | A1* | 8/2012 | Bushnell | G08G 5/045 701/13 |
| 2013/0317670 | A1* | 11/2013 | Magana Casado | G01C 23/00 701/3 |

OTHER PUBLICATIONS

Hwang, Inseok et al., Flight-Mode-Based Aircraft Conflict Detection using a Residual-Mean Interacting Multiple Model Algorithm, American Institute of Aeronautics and Astronautics Guidance, Navigation, and Control Conference and Exhibit, 2003, AIAA, Reston, VA.

Mazor, E. et al., Interacting Multiple Model Methods in Target Tracking: A Survey, IEEE Transactions on Aerospace and Electronic Systems, Jan. 1998, vol. 34, No. 1, pp. 103-123, IEEE, Piscataway, United States.

Lainiotis, Demetrios G., Partitioning: A Unifying Framework for Adaptive Systems, I: Estimation, Proceedings of the IEEE, Aug. 1976, vol. 64, No. 8, pp. 1126-1143, IEEE, Piscataway, United States.

Innocenti, Mario et al., Air Traffic Management Using Probability Function Fields, American Institute of Aeronautics & Astronautics, pp. 1088-1097, 1999, AIAA, Reston, United States.

Krishnamurthy, Karthik et al., An Intelligent Flight Director for Autonomous Aircraft, American Institute of Aeronautics & Astronautics, 2000, pp. 1-9, AIAA, Reston, United States.

Krishnamurthy, Karthik et al., An Intelligent Inference Engine for Autonomous Aerial Vehicles, American Institute of Aeronautics & Astronautics, 1999, pp. 650-660, AIAA, Reston, United States.

Ebrahimi, Yaghoob et al., CTAS Performance Model Validation, American Institute of Aeronautics & Astronautics, 2000, pp. 1-11, AIAA, Reston, United States.

Lambrecht, Martin et al., Departure Trajectory Modeling for Air Traffic Control Automation Tools, American Institute of Aeronautics & Astronautics, 1999, pp. 1507-1520, AIAA, Reston, United States.

Chatterji, G.B. et al., American Institute of Aeronautics and Astronautics, Inc., 1996, pp. 1-11, AIAA, Reston, United States.

Krozel, Jimmy et al., Intent Interference and Strategic Path Prediction, American Institute of Aeronautics and Astronautics, 2005, pp. 1-16, AIAA, Reston, United States.

Chatterji, Gano B., Short-Term Trajectory Prediction Methods, American Institute of Aeronautics & Astronautics, 1989, pp. 1496-1506, AIAA, Reston, United States.

Innocenti, Mario et al., Spatial Trajectory Generation for Conflict Avoidance in Air Traffic Management, American Institute of Aeronautics & Astronautics, 2000, pp. 1-10, AIAA, Reston, United States.

Konyak, Michael A. et al., A Demonstration of an Aircraft Intent Interchance Specification for Facilitating Trajectory-Based Operations in the National Airspace System, Aerospace Research Central, 2008, pp. 1-17, American Institute of Aeronautics and Astronautics, Reston, United States.

Kuchar, James K. et al., A Review of Conflict Detection and Resolution Modeling Methods, IEEE Transactions on Intelligent Transportation Systems, vol. 1, No. 4, Dec. 2000, pp. 179-189, IEEE, Piscataway, United States.

Green, Steven M. et al., Field Evaluation of Descent Advisor Trajectory Prediction Accuracy, Aerospace Research Central, Jul. 1996, pp. 1-13, American Institute of Aeronautics and Astronautics, Inc., Reston, United States.

Yang, Lee C. et al., Using Intent Information in Probabilistic Conflict Analysis, Aerospace Research Central, 1998, pp. 797-806, American Institute of Aeronautics and Astronautics, Inc., Reston, United States.

Li, X. Rong et al., Design of an Interacting Multiple Model Algorithm for Air Traffic Control Tracking, IEEE Transactions on Control Systems Technology, vol. 1, No. 3, Sep. 1993, pp. 186-194, IEEE, Piscataway, United States.

Zhao, Yiyuan et al., Analysis of Pilot Intent Parameters in Air Traffic Management, Proceedings of the American Control Conference, Jun. 1998, vol. 3, pp. 1789-1792, IEEE, Piscataway, United States.

Henderson, Jeff et al., Trajectory Prediction Accuracy and Error Sources for Regional Jet Descents, AIAA Guidance, Navigation, and Control (GNC) Conference, Aerospace Research Central, 2013, pp. 1-20, American Institute of Aeronautics and Astronautics, Inc., Reston, United States.

Chan, William et al., Improving and Validating CTAS Performance Models, American Institute of Aeronautics and Astronautics, 2000, pp. 1-9, American Institute of Aeronautics and Astronautics, Inc., Reston, United States.

Coppenbarger, Richard A., Climb Trajectory Prediction Enhancement Using Airline Flight-Planning Information, American Institute of Aeronautics and Astronautics, 1999, pp. 1-11, American Institute of Aeronautics and Astronautics, Inc., Reston, United States.

Hwang, I. et al., State estimation for hybrid systems: applications to aircraft tracking, IEEE Proc.—Control Theory Appl. vol. 153, No. 5, Sep. 2006, pp. 556-566, IEEE, Piscataway, United States.

Krozel, Jimmy, Intent Inference for Free Flight Aircraft, AIAA Guidance, Navigation, and Control Conference, Aug. 2000, American Institute of Aeronautics and Astronautics, Inc., Reston, United States.

Wanke, Craig R., Measuring Uncertainty in Airspace Demand Predictions for Traffic Flow Management Applications, Preprint for the 2003 AIAA Guidance, Navigation, and Control Conference, Aug. 2003, pp. 1-11, American Institute of Aeronautics and Astronautics, Inc., Reston, United States.

Yang, Lee C. et al., Prototype Conflict Alerting System for Free Flight, Aerospace Research Central, 1997, pp. 1-9, American Institute of Aeronautics and Astronautics, Inc., Reston, United States.

Stengel, Robert F., Toward Intelligent Flight Control, IEEE Transactions on Systems, Man, and Cybernetics, vol. 23, No. 6, Nov./Dec. 1993, pp. 1699-1717, IEEE, Piscataway, United States.

* cited by examiner

DATA DRIVEN AIRPLANE INTENT INFERENCING

BACKGROUND

The present invention relates to vehicle traffic monitoring, and more specifically, to providing predicted intents for current vehicle operations to a monitor and to provide alerts in the event that a distance between predicted trajectories for two vehicle operations is below a threshold limit.

SUMMARY

According to at least one aspect, a computer-implemented method for vehicle intent prediction includes generating, using a computer processor, vehicle intent prediction models for different vehicle operations, based on past instances of vehicle tracks for the vehicle operations and known vehicle intent data for the past instances. The method also includes, for a current operation of a first of the different vehicle operations, predicting a first vehicle intent, based on current vehicle track data for the first vehicle operation and the generated vehicle intent prediction model for the first vehicle operation.

According to at least one aspect, a computer program product for predicting vehicle intent includes a computer-readable storage medium having computer-readable program code embodied therewith. The computer-readable program code executable by one or more computer processors to generate vehicle intent prediction models for different vehicle operations, based on past instances of vehicle tracks for the vehicle operations and known vehicle intent data for the past instances. The computer-readable program code is also executable to, for a current operation of a first of the different vehicle operations, predict a first vehicle intent, based on current vehicle track data for the first vehicle operation and the generated vehicle intent prediction model for the first vehicle operation.

According to at least one aspect, a system includes memory storing past instances of vehicle tracks for various vehicle operations and known vehicle intent data for the past instances. The system also includes a processor configured to generate vehicle intent prediction models for different vehicle operations, based on the past instances of vehicle tracks for the vehicle operations and the known vehicle intent data for the past instances. The processor is also configured to, for a current operation of a first of the different vehicle operations, predict a first vehicle intent, based on current vehicle track data for the first vehicle operation and the generated vehicle intent prediction model for the first vehicle operation.

DETAILED DESCRIPTION

In the following, reference is made to particular aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Air traffic controllers direct aircraft through various regions of airspace. In congested regions, air traffic controllers often must redirect aircraft to maintain separation between different aircraft. The separations are often dictated by government agencies (e.g., the Federal Aviation Administration). In various instances, computer software may assist air traffic controllers by monitoring various aircraft and providing warnings to air traffic controllers that two aircraft are on paths that would result in a separation distance that is less than a minimum separation distance.

Figure 1:
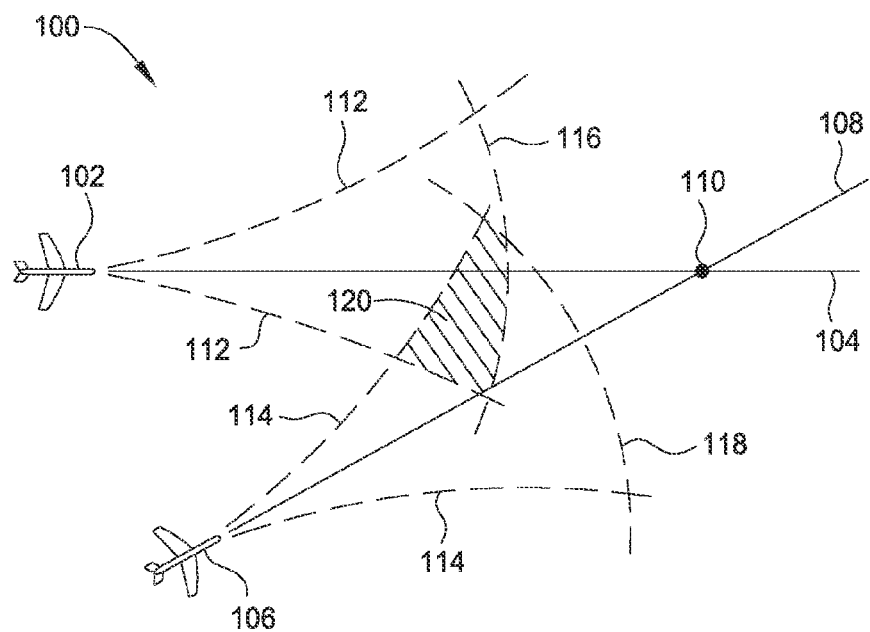
FIG. 1 is a top down depiction of two aircraft, wherein current vehicle tracks of the two aircraft and arcs representing possible maneuvering regions of the two aircraft are shown, and wherein possible conflicting portions of the regions are identified.

FIG. 1 depicts a scenario 100 in which a first aircraft 102 is at a first illustrated position (e.g., latitude, longitude, and altitude) and is on a first current vehicle trajectory 104 and a second aircraft 106 is at a second illustrated position and is on a second vehicle trajectory 108. The illustrated positions of the aircraft may be determined by surveillance (e.g., radar) or navigation systems (e.g., GPS and Automatic Dependent Surveillance-Broadcast). The first current vehicle trajectory 104 and the second vehicle trajectory 108 could be extrapolated from vehicle track data. The track data is a sequence of discrete time-referenced vehicle positions as measured by the surveillance and/or navigation systems. The first vehicle trajectory 104 and the second vehicle trajectory 108 intersect at a location 110 (assuming that the first aircraft 102 and the second aircraft 106 arrive at the location 110 at the same time). If the first aircraft 102 and the second aircraft 106 remain on the first current vehicle trajectory 104 and the second current vehicle trajectory 108, respectively, a monitoring system could output an alert to an air traffic controller when the first aircraft 102 and/or the second aircraft 104 are a certain distance from the location 110 (e.g., 5 miles or 10 miles). The monitoring system could also account for what the first aircraft 102 and the second aircraft 106 could do in the near future to avoid a collision at location 110. For example, FIG. 1 illustrates dashed lines 112, which represent trajectories within the maneuvering capabilities of the first aircraft 102 if the first aircraft 102 began to turn, climb, and/or descend. Similarly, FIG. 1 illustrates dashed lines 114, which represent trajectories within the maneuvering capabilities of the second aircraft 106 if the second aircraft 106 began to turn, climb, and/or descend. Of course, given enough time, the first aircraft 102 and the second aircraft 106 could fly to almost any location. Thus, the maneuvering capabilities represented by the dashed lines 112/114 only provide a meaningful constraint on the respective aircrafts for a limited period of time in the future. FIG. 1 illustrates dashed line 116, which represents a travel distance for the first aircraft 102 in a given period of time (e.g., 10 seconds) along the present and possible trajectories. Similarly, FIG. 1 illustrates dashed line 118, which represents a travel distance for the second aircraft 106 in a given period of time along the present and possible trajectories. The maneuvering capabilities of the first aircraft 102 and the second aircraft 106 are only calculated out to the travel distance associated with the dashed lines 116 and 118. As shown in FIG. 1, there is an overlapping region 120 within the maneuvering capabilities of the first aircraft 102 and the second aircraft 106. Put differently, if the first aircraft 102 turned toward the second aircraft 106 and/or the second aircraft 106 turned toward the first aircraft 102, there is risk of the two aircraft being closer than a minimum separation distance. As a result, the monitoring system could output an alert to an air traffic controller based on the above-described scenario 100.

Such physics-based monitoring systems (based on the maneuvering capabilities of the aircraft) can be problematic because they may output many unnecessary alerts for aircraft that could, theoretically, collide with one another but in reality will not. Such unnecessary alerts could overload the air traffic controller with extraneous information and/or desensitize the air traffic controller to alerts for actual collision risks. In aspects described herein, vehicle trajectory prediction models are used to predict the future tracks for current vehicle operations to distinguish real collision risks from vehicle operations that do not pose a collision risk.

Figure 2:
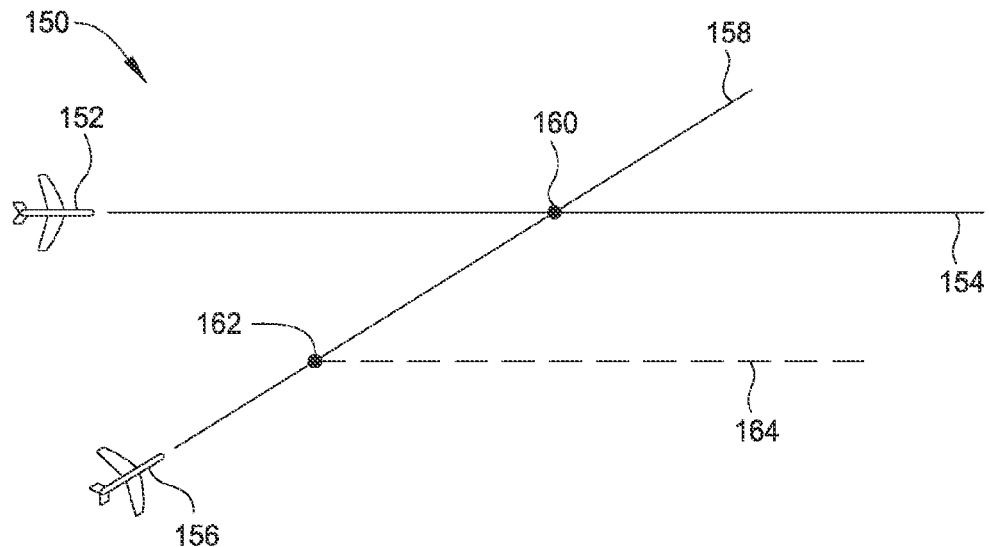
FIG. 2 is a top down depiction of two aircraft, wherein current flight paths of the two aircraft are shown, and wherein a predicted vehicle track is also shown for one of the aircraft.

FIG. 2 illustrates a scenario 150 in which a first aircraft 152 is flying along a first vehicle track 154 and a second aircraft 156 is flying along a second vehicle track 158. The first vehicle track 154 and the second vehicle track 158 intersect at a location 160 (assuming that the first vehicle 152 and the second vehicle 156 would arrive at the location 160 at the same time). The monitoring system described with reference to FIG. 1 may issue an alert regarding an impending collision between the first aircraft 152 and the second aircraft 156 at the location 160. However, in aspects described herein, a vehicle intent prediction model may be used to predict that the second aircraft 156 will turn at location 162 onto a predicted future vehicle trajectory 164. Based on the predicted future vehicle trajectory 164, there would be no collision risk and aspects described herein would not issue an alert to an air traffic controller.

In many instances, an airline may prefer that a particular route from a departure airport to a destination airport follow a particular four dimensional path (i.e., latitude, longitude, altitude, and speed). For example, the airline may prefer a particular lateral route (i.e., latitude and longitude) that enables the use of a particular airport that the airline services as an alternate airport. As another example, the airline may prefer a particular lateral route based on minimize travel distance and/or minimized travel time. As another example, an airline may prefer a particular top of descent point for a route based on a minimum fuel use strategy. As another example, the airline may prefer a particular top of descent point for a route based on a minimized travel time. As another example, an airline may prefer to fly a route at a particular cruise speed to maximize fuel efficiency. As yet another example, an airline may prefer to fly a particular route at a different particular cruise speed to minimize travel time. The route preferences may vary from airline to airline or from route to route within an airline. For example, a first airline could have a policy that all of its flights should cruise at an airspeed of no greater than Mach 0.78, unless otherwise directed by air traffic control, to save fuel. Another airline could have a policy that all of its flights should cruise as close to maximum cruise speed as possible, unless otherwise directed by air traffic control, to minimize travel time. As another example, an airline could have different policies for different flights. For example, an airline may direct a first flight between two hub airports to fly at a high speed (e.g., Mach 0.82) to increase the likelihood that the flight arrives at the destination airport on time and passengers will be able to make their connecting flights. The airline may direct a second flight to and from a non-hub airport to fly at a lower speed (e.g., Mach 0.75) to save fuel since connecting flights are less of an issue.

In various aspects described below, machine learning algorithms can be used to analyze vehicle track data from past instances of vehicle operations as well as known vehicle intent data for the past instances of vehicle operations to generate vehicle intent prediction models for the various vehicle operations. In various aspects, contextual factors, such as weather and aircraft type, can also be used to generate the vehicle intent prediction models. The vehicle intent prediction models can be generated in real time or near-real-time and can then be used to predict vehicle intent for current vehicle operations based on the current vehicle track of the vehicle operations. The vehicle intent prediction model can be used to predict future vehicle trajectories for the various vehicle operations in real time or near-real-time. The predicted future vehicle trajectories can be used to limit the number of alerts to air traffic controllers to instances in which the predicted future vehicle trajectories are likely to result in two aircraft colliding or closing to a distance from one another that is less than a threshold amount.

Figure 3:
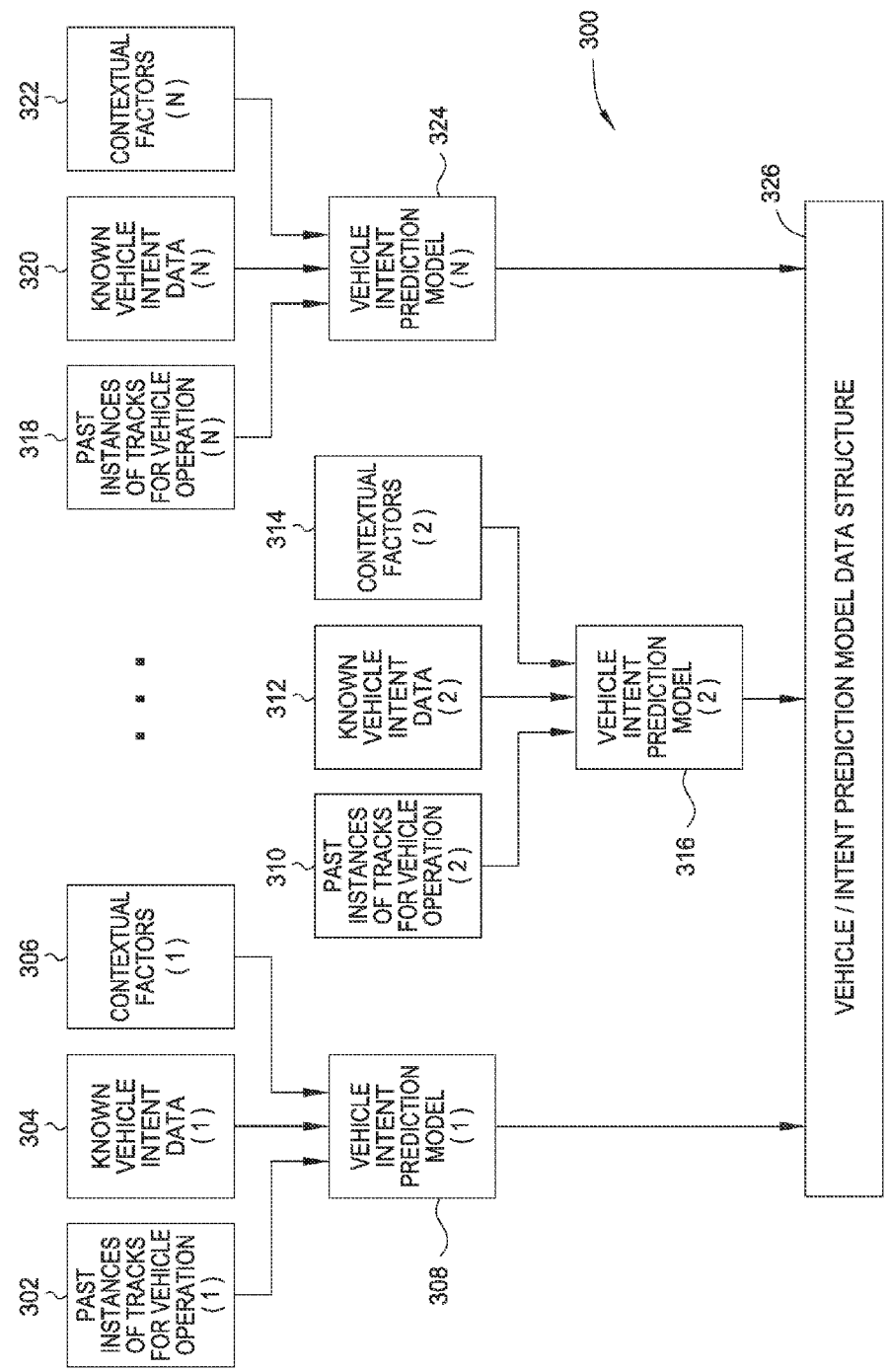
FIG. 3 is a schematic diagram that illustrates a method for forming vehicle intent prediction models for different vehicle operations.

FIG. 3 is a schematic block diagram of a method 300 for generating a vehicle intent prediction model data structure 326 (e.g., a database). In block 302, data for past instances of vehicle tracks for a first vehicle operation are retrieved. For example, the data of the past instances of vehicle tracks could include the latitude, longitude, altitude, and airspeed of a particular vehicle at different points in time along a route. The data of the past instances of vehicle tracks could also include identifiers associated with airway intersections that the aircraft flies through. In various aspects, the vehicle operation can be defined by an airline route number. For example, a particular airline may identify flight number 1 number as a flight from John F. Kennedy International Airport (JFK) in New York City, N.Y. to Los Angeles International Airport (LAX) in Los Angeles, Calif. departing at 6:00 AM. The airline may identify flight number 2 as a flight from JFK to LAX departing at 1:00 PM. Flight number 1 for the particular airline could be a first vehicle operation and flight number two for the airline could be a second vehicle operation. In various aspects, a vehicle operation could be defined by a city pair for the route (e.g., a departure airport and a destination airport) and a time and/or a window of time for the flight to depart. Such a definition for a vehicle operation could be advantageous where the airline may change the flight number and/or the time of departure for a flight number varies significantly day-to-day, for example.

In block 304, known vehicle intent data associated with the past instances of tracks for vehicle operations (from block 302) can be retrieved. The vehicle intent data could be retrieved from a data recorder. For example, for an aircraft, vehicle intent data could be retrieved from a flight data recorder onboard the aircraft. In various instances, other data sources could be used to retrieve vehicle intent data. For example, Flight Operational Quality Assurance (FOQA) data could be used to provide vehicle intent data for aircraft. In various aspects, vehicle intent data can be provided according to the Aircraft Intent Description Language (AIDL), which is described in Gallo, E., and Lopez-Leones, J., "Aircraft Intent Description Language (AIDL) Specification v 1.1," BRTE-ATT0725-AIDK1100-SPEC, Boeing Research & Technology Europe, 28 Sep. 2007, the entire contents of which are incorporated by reference herein. Vehicle intent data is data that unambiguously defines the operation of the aircraft. For example, aircraft intent data could define three degrees of freedom (e.g., longitudinal control, lateral control, and thrust control) and three configuration degrees of freedom (e.g., high lift devices, speed brakes, and landing gear). As another example, the aircraft intent data could include guidance modes being executed by a flight management system (FMS) of the aircraft. For example, an aircraft may be flying at a constant altitude (i.e., an altitude hold mode) and along a particular heading (i.e., a heading hold mode). In the context of an aircraft, the vehicle intent data could include data regarding information related to the speed of the aircraft, including Mach number, true airspeed, indicated airspeed, calibrated airspeed, equivalent airspeed, and/or absolute airspeed. The vehicle intent data could also include data regarding the horizontal speed and the vertical speed of the aircraft. The vertical speed of the aircraft could include a speed (e.g., expressed in knots or miles per hour) and/or a rate of climb (e.g., expressed in feet per minute). The vehicle intent data for an aircraft could also include data regarding an energy share factor (ESF) and an acceleration factor. The vehicle intent data for an aircraft could also include data regarding geometric path angle data and aerodynamic path angle data. The vehicle intent data for an aircraft could also include data about geometric altitude data and geopotential pressure altitude data. The vehicle intent data for an aircraft could also include data regarding engine power regimes, such as data regarding a maximum takeoff regime, a go around regime, a maximum continuous power regime, a maximum climb regime, a maximum cruise regime, a high idle regime, and/or a low idle regime. The vehicle intent data for an aircraft could also include data regarding engine power parameters, such as data regarding a throttle control parameter, a thrust coefficient, a throttle control parameter, and a thrust parameter. The vehicle intent data for an aircraft could also include data regarding an aerodynamic bank angle. The vehicle intent data could also include data regarding an aircraft direction of travel, such as magnetic bearing data, true bearing data, magnetic heading data, and/or true bearing data.

The vehicle intent data for an aircraft could also include data regarding positioning of control surfaces for the aircraft. For example, the vehicle intent data could include data about the positions of ailerons, elevators, rudders, flaps, slats, spoilers, and/or landing gear of the aircraft. The vehicle intent data could also include data related to phase of flight (e.g., from a FMS). For example, the vehicle intent data could include takeoff phase data, climb phase data, top of climb data, cruise phase data, level change data, top of descent data, descent phase data, and landing phase data. The vehicle intent data for phase of flight could be mapped to the vehicle track data to indicate what phase of flight the aircraft is in at different points along the vehicle track for the route. The vehicle intent data for an aircraft could include data about modes of operation of an autopilot and/or an FMC at different points along a vehicle track. For example, the modes of operation data could include altitude hold data, airspeed hold data, heading hold data, vertical speed hold data, bearing hold data, autothrottle data, and/or bank angle data.

In block 306, the method 300 can include retrieving contextual data that could affect the vehicle track. For example, weather factors could affect the vehicle track data and/or the vehicle intent data for a particular instance of a vehicle operation. For example, an aircraft operation may follow a particular track on days with clear weather, but may deviate to a particular alternate track when thunderstorms develop in particular regions along the route. To illustrate, an exemplary flight from JFK to LAX may fly over the states of Missouri and Kansas when the weather is clear. However, if thunderstorms are developing in Missouri and Kansas, the exemplary flight may typically deviate around the thunderstorms. A first vehicle operation (e.g., for a first airline) may prefer to deviate to the north of the thunderstorms and a second vehicle operation (e.g., for a second airline) may prefer to deviate to the south of the thunderstorms. As another example, for flights from JFK to O'Hare International Airport (ORD) in Chicago, Ill., in the event that severe weather develops over ORD, a first vehicle operation may typically enter a holding pattern until the weather improves and a second vehicle operation may typically deviate to an alternate airport rather than wait for the weather to improve. As another example, aircraft generally cannot climb as quickly when the temperatures are hot and/or the density altitude is high (i.e., the air pressure is low). Thus, an aircraft may climb at a slower rate and along a shallower geometric path when the air temperatures are high and/or the density altitude is high than on a standard day. As a result, the vehicle operation may have a different top of climb point along the vehicle track for a hot day than during a standard day. As another example, an aircraft flying along a particular route in a crosswind may have a different configuration of its control surfaces than an aircraft flying along the particular route without a cross wind.

In various instances, the aircraft type could be contextual factor. Typically, an airline uses the same aircraft type for a particular vehicle operation. However, a different aircraft type may be used in various circumstances. The different aircraft may follow different routes between the departure airport and the arrival airport due to different capabilities of the different aircraft. For example, the different aircraft may have different cruising speeds. As another example, the aircraft may have different climb performance, reaching the top of climb points at different times and at different latitudes and longitudes.

In block 308, the method 300 performs a machine learning process on the retrieved past instances of vehicle tracks (block 302), the known vehicle intent data for the past instances (block 304), and, in some aspects, the contextual factors for the vehicle tracks (block 306) to generate a vehicle intent prediction model. In various instances, the machine learning process to generate the vehicle intent prediction model could use a multilayer perceptron, which is a feed forward artificial neural network. In various instances, the machine learning technique can include a resilient propagation supervised learning technique to generate the vehicle intent prediction model. As discussed in greater detail below, the vehicle intent prediction model receives a current vehicle track for an aircraft and any contextual factors as inputs. The vehicle intent prediction model generates a predicted vehicle future intent (i.e., where the aircraft is expected to do) based on the current track and the contextual factors.

As shown in FIG. 3, different vehicle intent prediction models are developed for different vehicle operations. Blocks 310, 312, and 314 relate to receiving past instances of tracks for a second vehicle operation, receiving known vehicle intent data for the past instances of the second vehicle operation, and contextual factors for the past instances of the second vehicle operation, respectively. The received data from blocks 310, 312, and 314 is used to form a vehicle intent prediction model for the second vehicle operation in block 316. A vehicle intent prediction model can be formed for many different vehicle operations. Blocks 318, 320, and 322 relate to receiving past instances of tracks for an nth vehicle operation, receiving known vehicle intent data for the past instances of the nth vehicle operation, and contextual factors for the past instances of the nth vehicle operation, respectively. The received data from blocks 318, 320, and 322 is used to form a vehicle intent prediction model for the nth vehicle operation in block 324. The vehicle intent prediction models (generated in blocks 308, 316, and 324) can be stored in a vehicle intent prediction model data structure 326.

Over time, the vehicle intent prediction models (e.g., vehicle intent prediction models 308, 316, and 324 in FIG. 3) can be updated by including new past instances of vehicle tracks for the vehicle operations, known vehicle intent data for the new past instances, and/or contextual factors for the new past instances. In various aspects, the oldest past instances could be replaced by the newest past instances of vehicle operations to generate the vehicle intent prediction models. In various other aspects, the newest past instances could be added to the existing past instances of vehicle operations to generate the vehicle intent prediction models.

Figure 4A:
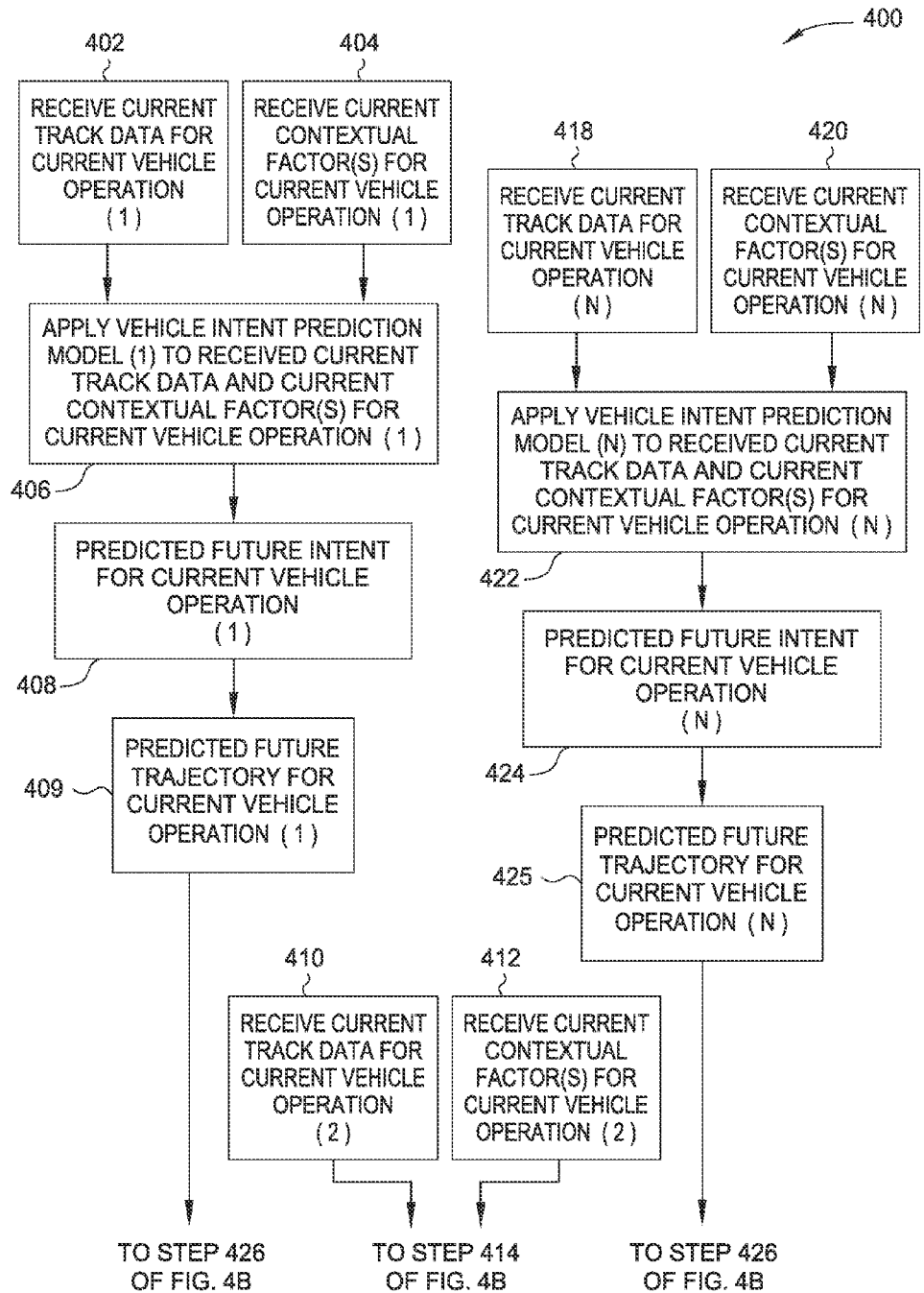
FIGS. 4A and 4B are a schematic diagram that illustrates a method for generating predicted vehicle future trajectories for current vehicle operations, for identifying instances in which future tracks are closer than a threshold limit, and generating an alert.

Referring now to FIG. 4A, during a current first vehicle operation that is in progress, the vehicle intent prediction model for the vehicle operation can be used in a method 400 to predict the future track for the first vehicle operation. In block 402, data regarding the current vehicle track for the first vehicle operation can be retrieved. For example, for an aircraft, the current vehicle track data could include a real-time or near-real-time latitude, longitude, and altitude. The current vehicle track could be retrieved from a radar return, transponder data, and/or Automatic Dependent Surveillance—broadcast (ADS-B) data, for example. In block 404, data regarding current contextual factors for the current first vehicle operation can be retrieved. For example, weather data could be retrieved from a weather radar system and/or a weather data service, such as NEXRAD weather. In block 406, the current track data and the current contextual factors for the first vehicle operation can be applied to the vehicle intent prediction model for the first vehicle operation. In block 408, the vehicle intent prediction model outputs a predicted future vehicle intent for the current first vehicle operation. In various instances, in block 409, the predicted future vehicle intent could be transformed into a predicted future vehicle trajectory. In such instances, the predicted vehicle future trajectory calculated based on the current position of the vehicle and the predicted future vehicle intent of the vehicle. For example, if an aircraft is currently located at a particular latitude and longitude and the predicted vehicle future intent indicates that the aircraft is about to turn to a heading of due north, the predicted vehicle future trajectory could start from the current location and heading and could include a turn to the true north heading. The predicted vehicle future trajectory could then continue in a due north direction. The predicted vehicle future trajectory could be output as a series of latitudes, longitudes, and altitudes at sequential future times. In various instances, the predicted vehicle future trajectory could be output as a graphical representation on a computer display screen (e.g., display screen 506 in FIG. 5, discussed below).

Predicted vehicle future intents for other current vehicle operations can also be calculated. For example, blocks 410 and 412 are related to receiving current track data and current contextual data for a second vehicle operation. In block 414, the received current track data and current contextual data for the second vehicle operation are applied to a vehicle intent prediction model for the second vehicle operation. In block 416, a predicted future vehicle intent for the second vehicle operation is output. As another example, blocks 418 and 420 are related to receiving current track data and current contextual data for an nth vehicle operation. In block 422, the received current track data and current contextual data for the nth vehicle operation are applied to a vehicle intent prediction model for the nth vehicle operation. In block 424, a predicted future vehicle intent for the nth vehicle operation is output.

Figure 4B:
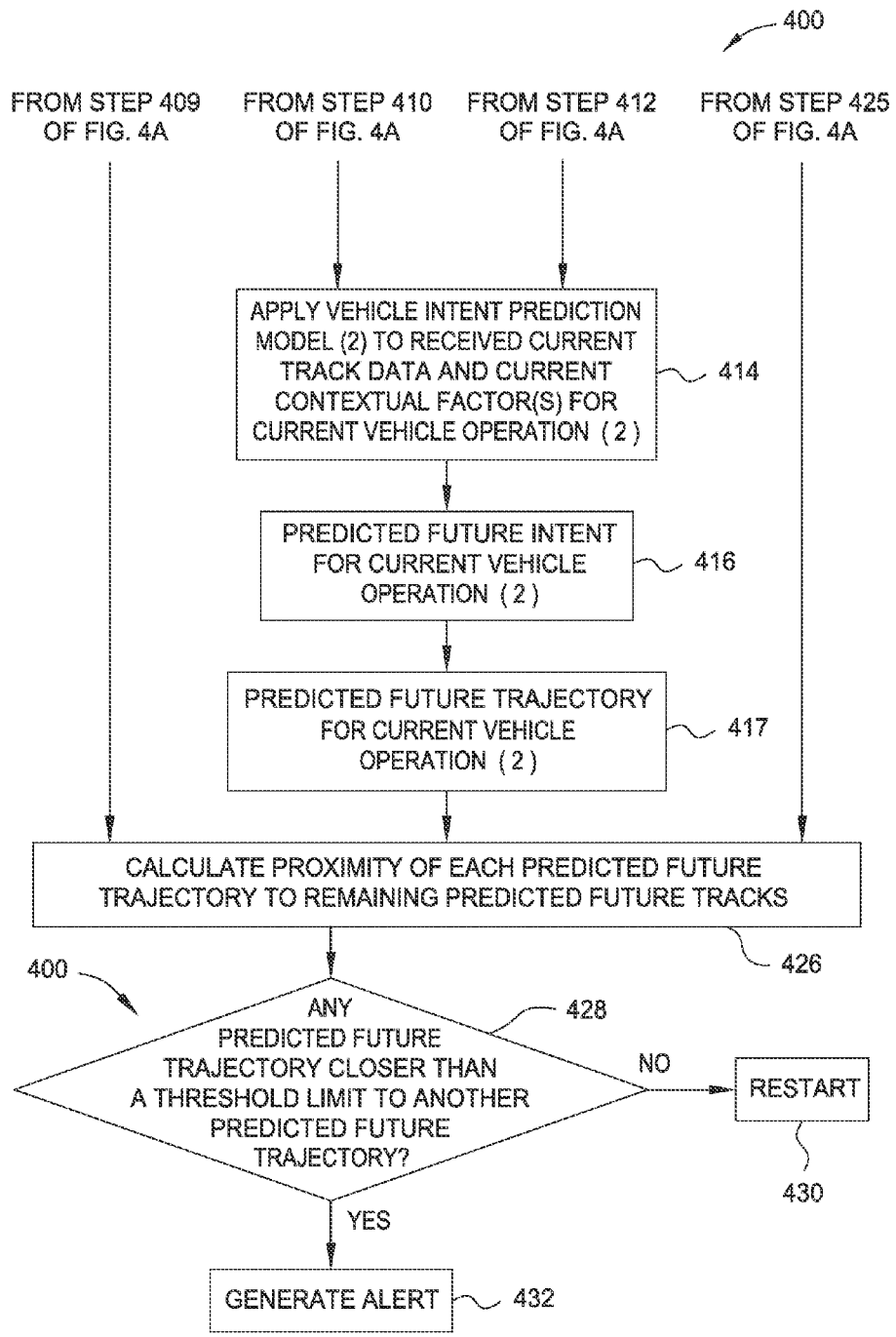

In various instances, the predicted vehicle future intents can be transformed to predicted vehicle future trajectories for the various current vehicle operations. For example, the predicted vehicle future intent for the second vehicle, determined in block 416, could be transformed to a predicted future trajectory for the second vehicle in block 417. Also, the predicted vehicle future intent for the nth vehicle, determined in block 424, could be transformed to a predicted future trajectory for the nth vehicle in block 425. The predicted vehicle future trajectories can be compared to calculate predicted proximities of the various vehicles based on the predicted vehicle future trajectories. For example, in block 426, the various predicted vehicle future trajectories for the first vehicle operation (from block 409), the second vehicle operation (from block 417), and the nth vehicle operation (from block 425) are compared to calculate a proximity of each predicted vehicle future trajectory to remaining predicted vehicle future trajectories. Referring now to FIG. 4B, in block 428, the method 400 determines whether any of the calculated proximities are less than a threshold amount. If not, then, in block 430, the method 400 restarts and calculates updated predicted vehicle future trajectories. If any of the proximities are less than the threshold amount, then, in block 432, an alert is generated.

In various aspects, the threshold amount could be set by a user. For example, an air traffic controller could manually set the predicted distance between aircraft that would result in an alert being generated. For example, an air traffic controller at an Air Route Traffic Control Center (ARTCC) could set the threshold amount to one mile, three miles, or five miles. By contrast, an approach controller at a Terminal Radar Approach Control (TRACON) facility could set the threshold amount to one half of a mile. In various instances, the threshold amount could be dynamically set by a computer processor. For example, a threshold amount for proximity between two relatively slow-moving aircraft could be less than a threshold amount between two relatively fast-moving aircraft. As another example, a threshold amount could be larger for a small aircraft following a large aircraft in a traffic pattern than for a large aircraft following a small aircraft in a traffic pattern.

The alerts generated in block 432 can take many forms. For example, a computer display screen for an air traffic controller could highlight the two aircraft predicted to fly too closely. As another example, the alert could include an audible alert, such as a beep, klaxon, and/or a siren sound. As another example, the alert could include an audible spoken alert, such as "SEPARATION WARNING FOR FLIGHT XXX and FLIGHT YYY" wherein "FLIGHT XXX" would be an identifier being used by the controller for a first affected flight operation and "FLIGHT YYY" would be an identifier being used by the controller for a second affected flight operation.

Figure 5:
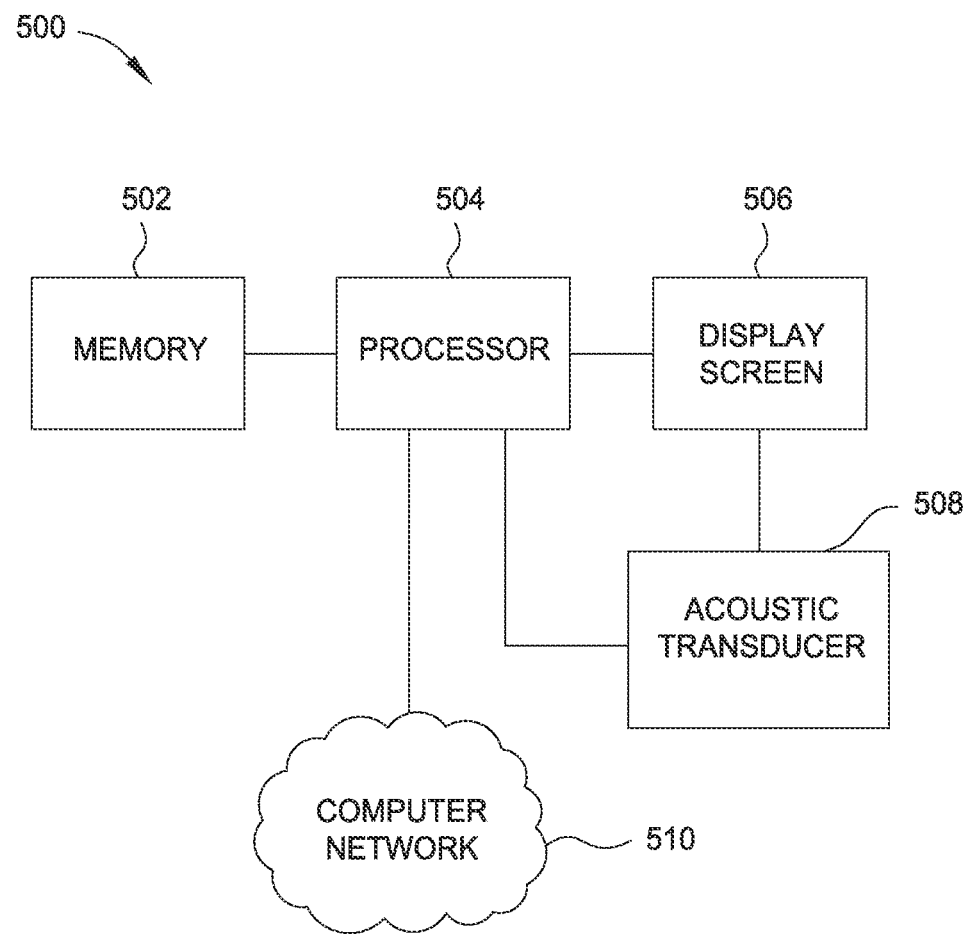
FIG. 5 is a schematic diagram that illustrates a system that can implement the method of FIG. 3 and/or the method of FIGS. 4A and 4B.

FIG. 5 illustrates a system 500 for implementing the methods discussed above with reference to FIGS. 3 and 4. The system 500 includes a memory 502 and a computer processor 504. The memory 502 can store one or more computer programs that are executable on the processor 504 to generate the vehicle intent prediction models and/or to calculate the predicted vehicle future intents for the vehicle operations. The memory 502 could also store data structures that store the vehicle intent prediction models, the vehicle tracks for past instances of the vehicle operations, and/or the contextual factors for the past instances of the vehicle operations. The computer processor 504 can also be in communication with a computer network 510. The computer network 510 can provide data for current tracks of vehicle operations. For example, an air traffic control surveillance system (e.g., radar) could be in communication with the computer network 510 and could provide data for current vehicle tracks for various vehicle operations. The computer network 510 could also be in communication with data sources that provide contextual data (e.g., weather information sources). The computer processor 504 is also in communication with a display screen 506 that can display the current vehicle tracks and predicted future vehicle trajectories (based on the predicted future vehicle intents) for the various vehicle operations. As discussed above, the display screen 506 could also display alerts when two vehicle operations are predicted to get closer than a threshold amount. In various aspects, the computer processor 504 could also be in communication with an acoustic transducer 508 that can generate an audible alert that is output by the processor 504.

The various aspects, described above, could be used by an air traffic control center to provide alerts to air traffic controllers in the event that aircraft following the predicted vehicle future trajectories (generated in blocks 408, 416, and 424 of FIG. 4A) indicate that two aircraft will be closer than a threshold distance. In various aspects, the vehicle intent prediction models could be used onboard aircraft. For example, the various vehicle intent prediction models could be provided to an airline, and the airline could upload the models to its aircraft. Computers onboard the aircraft (e.g., a Traffic Collision Avoidance System (TCAS) computer or an Automatic Dependent Surveillance-broadcast (ADS-B) system computer) could generate predicted future vehicle trajectories for other aircraft, based on the predicted future vehicle intents output by the vehicle intent prediction models and contextual factors (e.g., weather data determined from onboard weather radar and/or received from weather data services).

Figure 6:
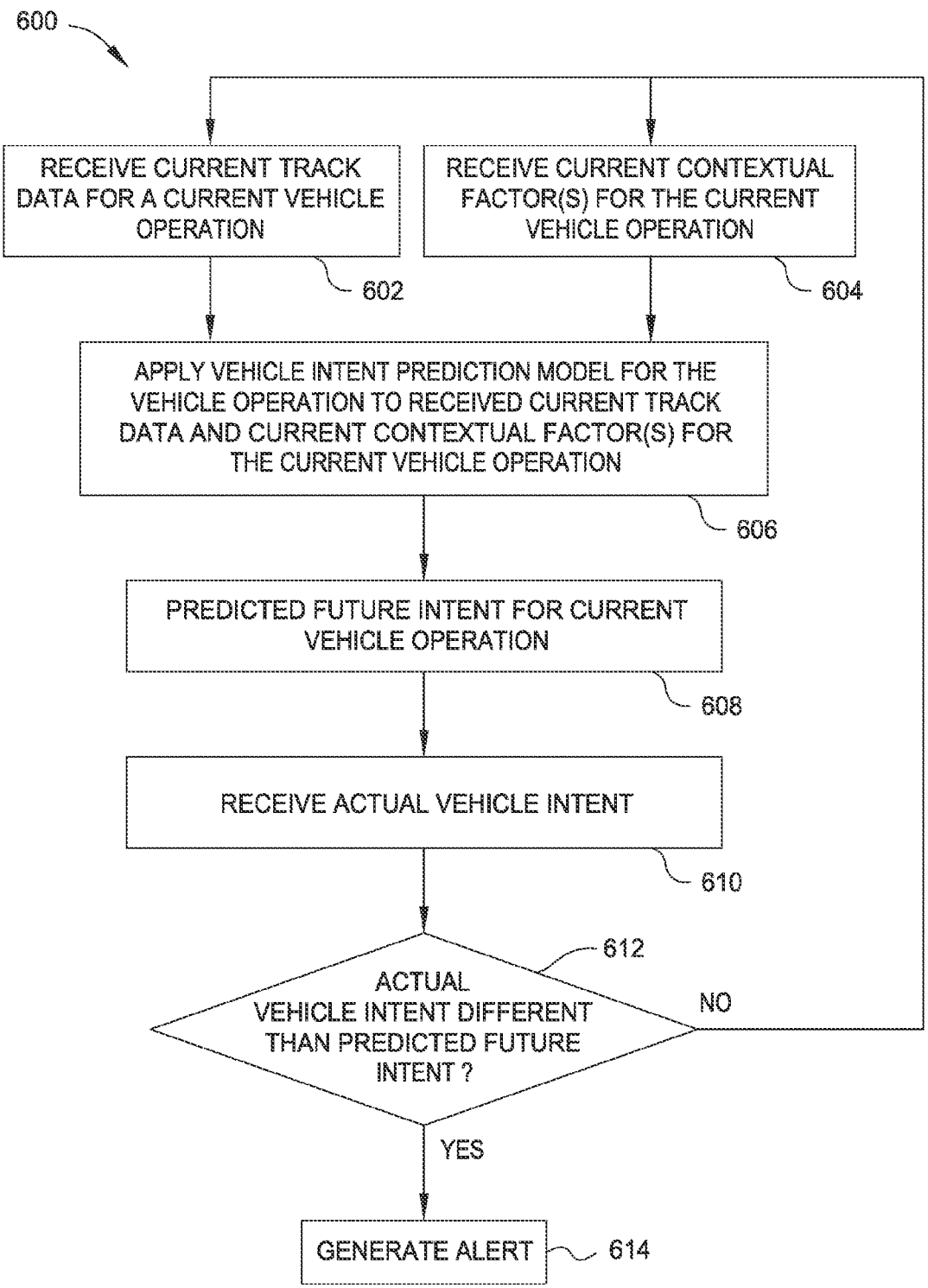
FIG. 6 is a flow chart for a method for generating alerts when a received actual vehicle intent differs from a predicted vehicle future intent.

Referring now to FIG. 6, in various aspects, the predicted future vehicle intents, output by the vehicle intent prediction models, could be used to detect vehicle operation anomalies. FIG. 6 illustrates a method 600 for generating an alert when received actual vehicle intent data differs from predicted future vehicle intent. In block 602, the method 600 receives current track data for a current vehicle operation. Block 602 could be similar in operation to block 402, discussed above with reference to FIG. 4A, for example. In block 604, the method 600 could receive current contextual factor(s) for the current vehicle operation. Block 604 could be similar in operation to block 404, discussed above with reference to FIG. 4A, for example. In block 606, the method 600 applies a vehicle intent prediction model for the vehicle operation (discussed above with reference to FIG. 3) to the received current track data and any current contextual factor(s) for the current vehicle operation. Block 606 could be similar in operation to block 406, discussed above with reference to FIG. 4A, for example. In block 608, the vehicle intent prediction model outputs a predicted future intent for the vehicle operation. Block 608 could be similar in operation to block 408, discussed above with reference to FIG. 4A, for example. In block 610, the method receives actual intent data for the vehicle. In block 612, the method 600 compares the received actual intent data to the predicted future intent for the vehicle operation. If the actual intent differs from the predicted intent, then in block 614, the method 600 generates an alert. If the actual intent does not differ from the predicted intent, then the method 600 returns to blocks 602 and 604. For example, a particular aircraft may fly a route from San Francisco International Airport to Denver International Airport. The aircraft may consistently fly the route at a cruise altitude of 36,000 feet every day. As a result, a vehicle intent prediction model for the flight of the aircraft may predict that the aircraft will reach an altitude of 36,000 feet when the aircraft flies over Sacramento, Calif. and will cruise at 36,000 feet until the aircraft passes over the Rocky Mountains. If the aircraft begins to descend over Reno, Nev. (e.g., if the pilot(s) instruct a descent and the descent data is transmitted over an ADS-B transceiver or if surveillance systems detect the descent), the indicated aircraft intent would differ from the predicted future intent for the aircraft. In such a scenario, a computer processor (e.g., computer processor 504 in FIG. 5) could generate an alert. In various instances, the computer processor 504 could detect a deviation significantly faster than a human vehicle traffic controller. Continuing the example, the aircraft may climb to an altitude of 39,000 feet on days when winds through the Rocky Mountains are high (and turbulence is also high). In this example, wind speed in the Rocky Mountains could be a contextual factor (block 604) that affects the application of the vehicle intent prediction model in block 606. Specifically, if the wind speed in the Rocky Mountains is high, the vehicle intent prediction model would output a predicted future intent (block 608) that includes the aircraft climbing to 39,000 feet. In the event the pilots do not climb or request a clearance to climb to 39,000 feet when the winds in the Rocky Mountains are high, an alert can be generated 614. For example, the pilot(s) of the aircraft may not be aware that winds are high and are not planning to climb to 39,000 feet. Such an alert could beneficially bring such an awareness issue to the attention of the ground controller and/or the pilot(s).

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

Aspects described herein may take the form of an entirely hardware aspect, an entirely software aspect (including firmware, resident software, micro-code, etc.) or an aspect combining software and hardware aspects that may all generally be referred to herein as a "circuit," "module" or "system."

Aspects described herein may be a system, a method, and/or a computer program product. The computer program product may include a computer readable storage medium (or media) having computer readable program instructions thereon for causing a processor to carry out aspects.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects may be provided to end users through a cloud computing infrastructure. Cloud computing generally refers to the provision of scalable, computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., applications that generate the vehicle intent prediction models or applications that calculate predicted future vehicle trajectories from the vehicle intent prediction model) or related data available in the cloud. For example, the vehicle intent prediction model application that generates the vehicle intent models could execute on a computing system in the cloud and output the vehicle intent prediction models. In such a case, the vehicle intent prediction model application could calculate the vehicle intent prediction models based on past instances of vehicle operations, known vehicle intent data, and contextual factors and store the vehicle intent prediction models at a storage location in the cloud. Doing so allows a user to access this information from any computing system attached to a network connected to the cloud (e.g., the Internet).

While the foregoing is directed to various aspects, other and further aspects may be devised without departing from the basic scope thereof, and the scope thereof is determined by the claims that follow.

What is claimed is:

1. A computer-implemented method for vehicle intent prediction, the method comprising:
   accessing, using a computer processor, vehicle intent prediction models for different vehicle operations, wherein the vehicle intent prediction models are based on past instances of vehicle tracks for the vehicle operations and known vehicle intent data for the past instances, wherein the known vehicle intent data comprises at least one of aircraft flight control surface positions, engine power setting, aircraft flight mode, flight management computer (FMC) control inputs, and pilot control inputs;
   for a current operation of a first of the different vehicle operations, predicting in real time a first vehicle intent, based on current vehicle track data for the first vehicle operation and the accessed vehicle intent prediction model for the first vehicle operation;
   predicting a first future vehicle trajectory based on the predicted first vehicle intent; and
   displaying the predicted first future vehicle trajectory on a computer display.

2. The computer-implemented method of claim 1, wherein the vehicle intent prediction models for different vehicle operations are further based on at least one contextual factor, and wherein the predicted first vehicle intent is based on the current vehicle track data for the first vehicle operation, at least one current contextual factor applicable to the current first vehicle operation, and the accessed vehicle intent prediction model for the first vehicle operation.

3. The computer-implemented method of claim 1, further comprising:
   for a current operation of a second of the different vehicle operations, predicting a second vehicle intent, based on current vehicle track data for the second vehicle operation and the accessed vehicle intent prediction model for the second vehicle operation;
   predicting a second future vehicle trajectory based on the predicted second vehicle intent; and
   upon determining that the predicted first future vehicle trajectory and the predicted second future vehicle trajectory are closer than a threshold limit, generating an alert.

4. The computer-implemented method of claim 3, wherein the threshold limit is user configurable.

5. The computer-implemented method of claim 3, wherein the vehicle intent prediction models for different vehicle operations are further based on at least one contextual factor;
   wherein the predicted first vehicle intent is based on the current vehicle track data for the first vehicle operation, at least one current contextual factor applicable to the first vehicle operation, and the accessed vehicle intent prediction model for the first vehicle operation; and
   wherein the predicted second vehicle intent is based on the current vehicle track data for the second vehicle operation, at least one current contextual factor applicable to the second vehicle operation, and the accessed vehicle intent prediction model for the first vehicle operation.

6. The computer-implemented method of claim 1, further comprising generating the vehicle intent prediction models for the different vehicle operations, wherein the vehicle operations are flights of commercial aircraft, and wherein the known vehicle intent includes at least one of:
   aircraft flight control surface positions;
   engine power setting;
   aircraft flight mode;
   flight management computer (FMC) control inputs; and
   pilot control inputs.

7. The computer-implemented method of claim 1, further comprising generating the vehicle intent prediction models for the different vehicle operations, wherein generating vehicle intent prediction models comprises performing a multilayer perceptron and resilient propagation analysis of the past instances of vehicle tracks and the known vehicle intent data.

8. The computer-implemented method of claim 1, further comprising receiving actual vehicle intent data; and
   upon the received actual vehicle intent data differing from the predicted vehicle intent, generating an alert.

9. A computer program product for predicting vehicle intent, the computer program product comprising:
   a computer-readable storage medium having computer-readable program code embodied therewith, the computer-readable program code executable by one or more computer processors to:
      access vehicle intent prediction models for different vehicle operations, wherein the vehicle intent prediction models are based on past instances of vehicle tracks for the vehicle operations and known vehicle intent data for the past instances, wherein the known vehicle intent data comprises at least one of aircraft flight control surface positions, engine power setting, aircraft flight mode, flight management computer (FMC) control inputs, and pilot control inputs;

for a current operation of a first of the different vehicle operations, predict in real time a first vehicle intent, based on current vehicle track data for the first vehicle operation and the accessed vehicle intent prediction model for the first vehicle operation;

predict a first future vehicle trajectory based on the predicted first vehicle intent; and output for display the predicted first future vehicle trajectory on a computer display.

10. The computer program product of claim 9, wherein the vehicle intent prediction models for different vehicle operations are further based on at least one contextual factor, and wherein the predicted first vehicle intent is based on the current vehicle track data for the first vehicle operation, at least one current contextual factor applicable to the current first vehicle operation, and the accessed vehicle intent prediction model for the first vehicle operation.

11. The computer program product of claim 9, wherein the computer-readable program code is further executable to:

for a current operation of a second of the different vehicle operations, predict a second vehicle intent, based on current vehicle track data for the second vehicle operation and the accessed vehicle intent prediction model for the second vehicle operation;

predict a second future vehicle trajectory based on the predicted second vehicle intent; and upon determining that the predicted first future vehicle trajectory and the predicted second future vehicle trajectory are closer than a threshold limit, generate an alert.

12. The computer program product of claim 11, wherein the threshold limit is user configurable.

13. The computer program product of claim 11, wherein the vehicle intent prediction models for different vehicle operations are further based on at least one contextual factor;

wherein the predicted first vehicle intent is based on the current vehicle track data for the first vehicle operation, at least one current contextual factor applicable to the first vehicle operation, and the accessed vehicle intent prediction model for the first vehicle operation; and wherein the predicted second vehicle intent is based on the current vehicle track data for the second vehicle operation, at least one current contextual factor applicable to the second vehicle operation, and the accessed vehicle intent prediction model for the first vehicle operation.

14. The computer program product of claim 9, wherein the computer-readable program code is further executable to generate the vehicle intent prediction models for the different vehicle operations, wherein the vehicle operations are flights of commercial aircraft, and wherein the known vehicle intent includes at least one of:

aircraft flight control surface positions;
engine power setting;
aircraft flight mode;
flight management computer (FMC) control inputs; and
pilot control inputs.

15. The computer program product of claim 9, wherein the computer-readable program code is further executable to generate the vehicle intent prediction models for the different vehicle operations, wherein the vehicle intent prediction models are generated by performing a multilayer perceptron and resilient propagation analysis of the past instances of vehicle tracks and the known vehicle intent data.

16. The computer program product of claim 9, wherein the computer-readable program code is further executable to receive actual vehicle intent data; and upon the received actual intent data differing from the predicted vehicle intent, generating an alert.

17. A system, comprising:

memory storing past instances of vehicle tracks for various vehicle operations and known vehicle intent data for the past instances; and a processor configured to:

access vehicle intent prediction models for different vehicle operations, wherein the vehicle intent prediction models are based on the past instances of vehicle tracks for the vehicle operations and the known vehicle intent data for the past instances, wherein the known vehicle intent data comprises at least one of aircraft flight control surface positions, engine power setting, aircraft flight mode, flight management computer (FMC) control inputs, and pilot control inputs; for a current operation of a first of the different vehicle operations, predict in real time a first vehicle intent, based on current vehicle track data for the first vehicle operation and the accessed vehicle intent prediction model for the first vehicle operation;

predict a first future vehicle trajectory based on the predicted first vehicle intent; and output for display the predicted first future vehicle trajectory on a computer display.

18. The system of claim 17, wherein the vehicle intent prediction models for different vehicle operations are further based on at least one contextual factor, and wherein the predicted first vehicle intent is based on the current vehicle track data for the first vehicle operation, at least one current contextual factor applicable to the current first vehicle operation, and the accessed vehicle intent prediction model for the first vehicle operation.

19. The system of claim 17, wherein the processor is further configured to:

for a current operation of a second of the different vehicle operations, predict a second vehicle intent, based on current vehicle track data for the second vehicle operation and the accessed vehicle intent prediction model for the second vehicle operation;

predict a second future vehicle trajectory based on the predicted second vehicle intent; and upon determining that the predicted first future vehicle trajectory and the predicted second future vehicle trajectory are closer than a threshold limit, generate an alert.

20. The system of claim 17, wherein the processor is further configured to receive actual vehicle intent data; and upon the received actual vehicle intent data differing from the predicted vehicle intent, generating an alert.

21. The system of claim 17, wherein the processor is further configured to generate the vehicle track intent models for the different vehicle operations, wherein the vehicle track intent models are generated by performing a multilayer perceptron and resilient propagation analysis of the past instances of vehicle tracks and the known vehicle intent data.

* * * * *